(12) United States Patent
Chi et al.

(10) Patent No.: US 11,604,578 B2
(45) Date of Patent: Mar. 14, 2023

(54) TOUCH CONTROL METHOD AND TOUCH CONTROL SYSTEM APPLYING IHE SAME

(71) Applicant: BENQ CORPORATION, Taipei (TW)

(72) Inventors: Chin-Jui Chi, Taipei (TW); Pei-Wen Huang, Taipei (TW)

(73) Assignee: BenQ Corporation, Taipei (TW)

( * ) Notice: Subject to any disclaimer, the term of this patent is extended or adjusted under 35 U.S.C. 154(b) by 0 days.

(21) Appl. No.: 17/391,151

(22) Filed: Aug. 2, 2021

(65) Prior Publication Data

US 2022/0100365 A1    Mar. 31, 2022

(30) Foreign Application Priority Data

Sep. 30, 2020    (CN) .......................... 202011061761.X (51) Int. Cl.
  *G06F 3/041*    (2006.01)
  *G06F 3/04883*    (2022.01)
  *G06F 3/0482*    (2013.01)

(52) U.S. Cl.
  CPC ........ *G06F 3/04883* (2013.01); *G06F 3/0416* (2013.01); *G06F 3/0482* (2013.01); *G06F 2203/04808* (2013.01)

(58) Field of Classification Search
  CPC .. G06F 3/04883; G06F 3/0416; G06F 3/0482; G06F 2203/04808; G06F 3/04186; G06F 3/0488
  See application file for complete search history.

(56) References Cited

U.S. PATENT DOCUMENTS

| 8,429,565 | B2 * | 4/2013 | Agarawala .......... G06F 3/04812 715/702 |
| 9,684,521 | B2 | 6/2017 | Shaffer et al. |
| 2011/0239163 | A1 * | 9/2011 | Mochizuki ............ G06F 16/904 715/853 |
| 2013/0147771 | A1 * | 6/2013 | Chuang ................. G06F 3/0488 345/178 |

(Continued)

FOREIGN PATENT DOCUMENTS

| CN | 101593060 A | 12/2009 |
| TW | M241746 U | 8/2004 |

(Continued)

OTHER PUBLICATIONS

European Search Report dated Feb. 18, 2022.

*Primary Examiner* — Carolyn R Edwards (57) ABSTRACT

A touch control method includes steps of detecting a plurality of contact points being touched on a touch panel at a certain time; obtaining a plurality of distances between each two of the plurality of contact points; selecting a largest distance smaller than a predetermined distance among the distances; selecting the contact points falling into a first circular area formed by the two end points of the largest distance in the touch panel as a first contact point cluster and recognizing them as a first touch point; determine the first coordinate of the first touch point; selecting a second contact point cluster among the remaining contact points, by the same way, and recognizing them as a second touch point; obtaining the second coordinate of the second touch point; and performing data processing on a corresponding position of an image display area according to the first and/or second coordinate.

14 Claims, 7 Drawing Sheets

(56) References Cited

U.S. PATENT DOCUMENTS

| | | | | |
|---|---|---|---|---|
| 2013/0257748 A1* | 10/2013 | Ambrus | ................... | G01S 17/89 345/173 |
| 2013/0316817 A1* | 11/2013 | Tanzawa | ............... | G06F 3/0481 463/31 |
| 2017/0139537 A1* | 5/2017 | Maloo | ................... | G06F 3/0488 |
| 2018/0011529 A1* | 1/2018 | Tanzawa | ............... | A63F 13/822 |

FOREIGN PATENT DOCUMENTS

| | | |
|---|---|---|
| TW | 200617753 A | 6/2006 |
| TW | 200928905 A | 7/2009 |
| TW | I585671 B | 6/2017 |
| TW | I629615 B | 7/2018 |
| WO | 2015187319 A1 | 12/2015 |

\* cited by examiner

TOUCH CONTROL METHOD AND TOUCH CONTROL SYSTEM APPLYING THE SAME

This application claims the benefit of People's Republic of China application Serial No. 202011061761.X, filed Sep. 30, 2020, the subject matter of which is incorporated herein by reference.

BACKGROUND OF THE DISCLOSURE

Field of the Disclosure

The disclosure relates in general to a touch control method and applications of an electronic device, and more particularly to a touch control method of a display apparatus and a touch control system applying the same.

Description of the Related Art

A touch panel can not only have input functions like that keyboard and mouse provide, and humanized input functions such as handwriting input, but also can integrate input and output functions onto the same interface (such as a screen). Accordingly, the user can realize several operations, such as inputting commands, activating electronic devices, and/or clicking or opening various menus or functions including applications (APP) only by touching the screen with a finger or a stylus. With the increasing popularity of smart phones and tablet computers, the touch panel has become one of a user most accustomed input mode and one of the indispensable key components in electronic devices.

However, with the enlargement of touch panels, in addition to providing users with a larger touch area, it also changes user's operating habits. For example, when the touch panel is applied to a large-scale display apparatus, the users' habit of touching the touch panel may change accordingly from the traditional single-point touch mode using a single finger or stylus to a multi-point touch mode using their palm. Furthermore, there may be multiple people touching the touch panel with multiple palms at the same time, making the touch panel unable to distinguish which touch point is the one that the user really wants to operate, which leads to touch commands and the input being invalid, or leads to the program cannot be executed.

Therefore, there is a need to provide an advanced touch control method and applications thereof to a display apparatus to overcome the drawbacks of the prior art.

SUMMARY OF THE DISCLOSURE

One embodiment of the present disclosure is to provide a touch control method applied in a touch display apparatus which includes an image display area and a touch panel corresponding to the image display area, wherein the touch control method steps includes as follows: Firstly, a plurality of contact points being touched on the touch panel at a certain time are identified; and a plurality of distances between each two of the plurality of contact points are obtained. Afterwards, a largest distance smaller than a preset distance is select from the plurality of distances. A first contact points cluster among the plurality of contact points, that falls into a first circular area formed by two ends of the largest distance are recognized as belonging to a first touch point, and a first coordinate of the first touch point is then obtained. After excluding the first contact points cluster, a second largest distance smaller than the preset distance is selected from the rest of the plurality of distances. A second contact points cluster among the remaining of the plurality of contact points, that falls into a second circular area formed by two ends of the second largest distance is recognized as a second touch point, and a second coordinate of the second touch point is obtained. Subsequently, at least one data processing is performed on at least one corresponding position of the image display area according to at least one of the first coordinate and the second coordinate.

Another embodiment of the present disclosure provides a touch operating system applied to a touch display apparatus, which includes a touch panel and a data processing unit. The touch panel corresponds to an image display area of the touch display apparatus, and is used to identify a plurality of contact points being touched on a touch area of the touch panel at a certain time. The data processing unit is used to perform steps as follows: Firstly, a plurality of contact points being touched on the touch panel at a certain time are identified; and a plurality of distances between each two of the plurality of contact points are obtained. Afterwards, a largest distance smaller than a preset distance is select from the plurality of distances. A first contact points cluster among the plurality of contact points, that falls into a first circular area formed by two ends of the largest distance is recognized as a first touch point, and a first coordinate of the first touch point is then determined. After excluding the first contact points cluster, a second largest distance smaller than the preset distance is selected from the rest of the plurality of distances. A second contact points cluster among the remaining of the plurality of contact points that falls into a second circular area formed by two ends of the second largest distance is recognized as a second touch point, and a second coordinate of the second touch point is determined. Subsequently, at least one data processing is performed on at least one corresponding position of the image display area according to at least one of the first coordinate and the second coordinate.

According to the above description, the embodiments of the disclosure provide a touch control method and a touch operation system applied to a touch display apparatus. By using a preset distance as a judgment standard to divides a plurality of contact points being touched on a touch area of the touch display apparatus at a certain time into several contact points clusters, and the representative coordinates of these contact points clusters can be obtained to serve as the available touch points for performing at least one data processing, such as inputting instructions, starting electronic devices, and/or clicking or opening various menus or functions including applications (APP); meanwhile the operations of the data processing can be displayed on the corresponding position of the display area of the touch display apparatus. The problems that the conventional large-scale touch display apparatus cannot recognize the available touch points because of a plurality of points being touched at the same time can be thus resolved.

BRIEF DESCRIPTION OF THE DRAWINGS

The above and other aspects of the disclosure will become better understood with regard to the following detailed description of the preferred but non-limiting embodiment(s). The following description is made with reference to the accompanying drawings.

DETAILED DESCRIPTION OF THE DISCLOSURE

The present disclosure provides a touch operating method and system applied to a touch display apparatus, which can solve the problem that the conventional large touch screen cannot recognize the touch points because of multiple touches at the same time. The above and other aspects of the disclosure will become better understood by the following detailed description of the preferred but non-limiting embodiment(s). The following description is made with reference to the accompanying drawings:

Several embodiments of the present disclosure are disclosed below with reference to accompanying drawings. However, the structure and contents disclosed in the embodiments are for exemplary and explanatory purposes only, and the scope of protection of the present disclosure is not limited to the embodiments. It should be noted that the present disclosure does not illustrate all possible embodiments, and anyone skilled in the technology field of the disclosure will be able to make suitable modifications or changes based on the specification disclosed below to meet actual needs without breaching the spirit of the disclosure. The present disclosure is applicable to other implementations not disclosed in the specification.

Figure 1A:
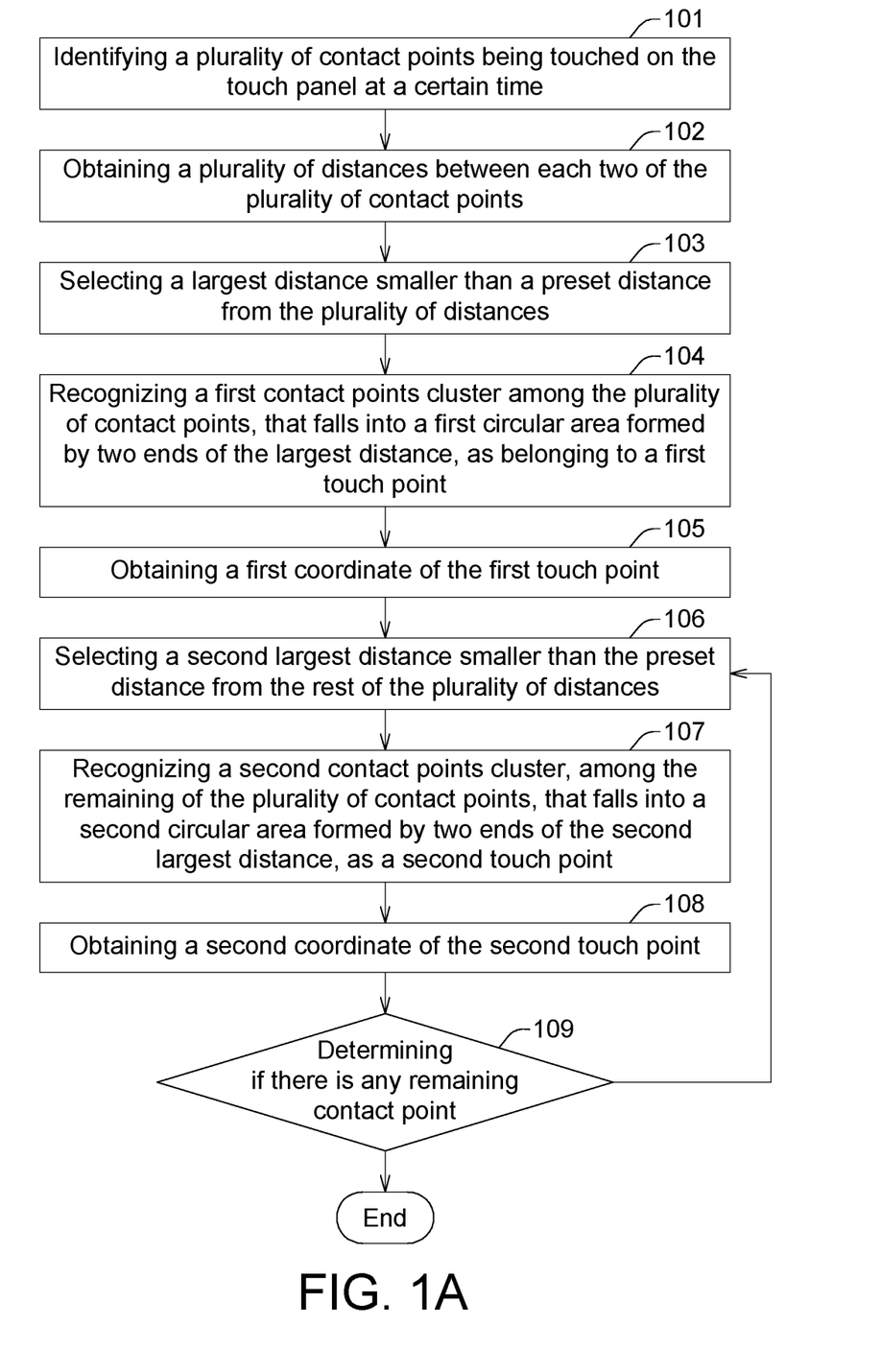
FIG. 1A is an operation flowchart of a touch control method applied to a touch display apparatus according to one embodiment of the present disclosure.

FIG. 1A is an operation flowchart of a touch control method applied to a touch display apparatus 10 according to one embodiment of the present disclosure. FIGS. 1B to 1F are schematic diagrams of the screen images of the touch display apparatus 10 performing the touch control method as depicted in FIG. 1A. The touch display apparatus 10 includes an image display area 11 and a touch operation system 12. The touch operation system 12 includes a touch panel 121 corresponding to the image display area 11 and a data processing unit 122 that executes the touch control method shown in FIG. 1A.

The touch display apparatus 10 can be (but not limited to) a smart phone, a tablet computer, a laptop computer, a personal digital assistant (PDA) or a display panel built in a portable electronic device; also, it can be a built-in touch display panel of a car electronic device or an aircraft or other means of transportation; or it can be a touch display panel of a fixed or movable indoor or outdoor billboard. In some embodiments of the present disclosure, the image display area 11 does not overlap with the touch panel 121, however these two can have coordinates corresponding to each other. For example, the two have coordinates that map to each other. In some other embodiments of the present disclosure, the touch panel 121 may be directly attached to the top of the display area 11.

The data processing unit 122 may be (but not limited to) a logic circuit built in the touch display apparatus 10, such as a general-purpose processor, special-purpose application circuitry, or a combination of these two, and may be electrically connected to the image display area 11 and the touch electrodes and/or the control chip (not shown) of the touch panel 121 respectively (but not limited to this regard). In some embodiments of the present disclosure, the data processing unit 122 may be any device with computing capabilities including (but not limited to) at least one of a system chip (SOC), a field programmable gate array (FPGA) chip, a complex programmable logic device (CPLD), a microprocessor, a central processing unit (CPU), other hardware components, software components, firmware components and a combination thereof (not shown).

The touch control method includes steps as follows: Firstly, a plurality of contact points being touched on the touch panel 121 at a certain time are identified (see step 101 in FIG. 1A). In some embodiments of the present disclosure, the plurality of contact points being touched on the touch panel 121 can be detected by measuring changes in capacitance, resistance, optics, sound energy, images, or other physical quantities obtained from different positions in the touch panel 121, according to different types of the touch panel 121 (e.g., capacitive touch panel, infrared touch panel, ultrasonic touch panel, resistive touch panel, electromagnetic touch panel, image sensor touch panel . . . Etc.).

Figure 1B:
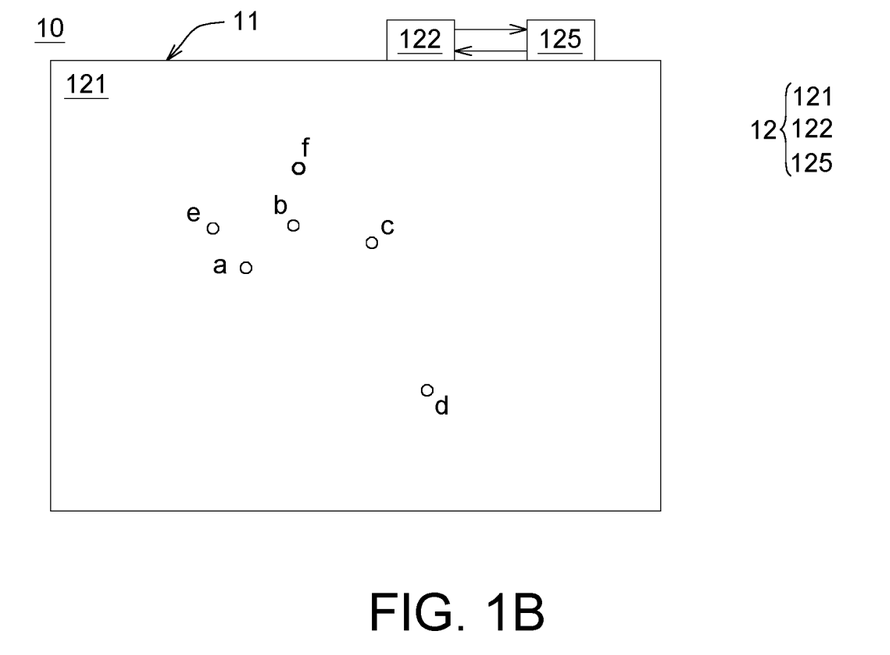
FIGS. 1B to 1F are schematic diagrams of the screen images of the touch display apparatus performing the touch control method as depicted in FIG. 1A.

For example, in the present embodiment, as shown in FIG. 1B, the touch panel 121 may be a capacitive touch panel, and it can be determined that there are 6 contact points a, b, c, d, e, and f being touched on the touch panel 121 according to the capacitance obtained by directly sensing the touch electrodes at different positions of the touch panel 121. The sensing data is then transmitted to the data processing unit 122 for logical operation.

Figure 1C:
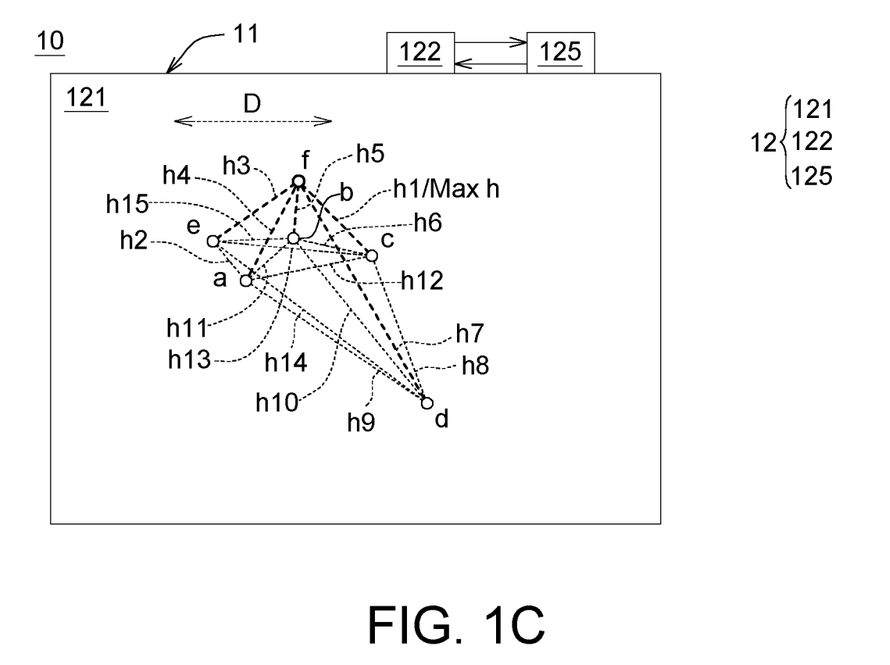

A plurality of distances between each two of the plurality of contact points are obtained (see step 102 in FIG. 1A). For example, in the present embodiment, a plurality of distances between each two of the 6 contact points a, b, c, d, e, and f are obtained. As shown in FIG. 1C, the distance between contact points c and f is h1; the distance between contact points a and e is h2; the distance between contact points e and f is h3; the distance between contact points a and f is h4; the distance between contact points b and f is h5; the distance between contact points b and c is h6; the distance between contact points d and f is h7; the contact point c and d is h8; the distance between contact points a and d is h9; the distance between contact points b and d is h10; the distance between contact points a and b The distance is h11; the distance between contact points a and c is h12; the distance between contact points e and c is h13; the distance between contact points e and d is h14; the distance between contact points e and b is h15.

Afterwards, a largest distance Max h smaller than a preset distance D is select from the plurality of distances h1-h15 (see step 103 in FIG. 1A). For example, in the present embodiment, an average palm width of an adult can be used as the preset distance D, which is pre-input into the database 125 of the touch operating system 12. The largest distance Max h meeting the above condition can be determined by the logical operations that is performed by the data processing unit 122 based on the pre-input data of the database 125 and the sensing data obtained from the touch panel 121.

Figure 1D:
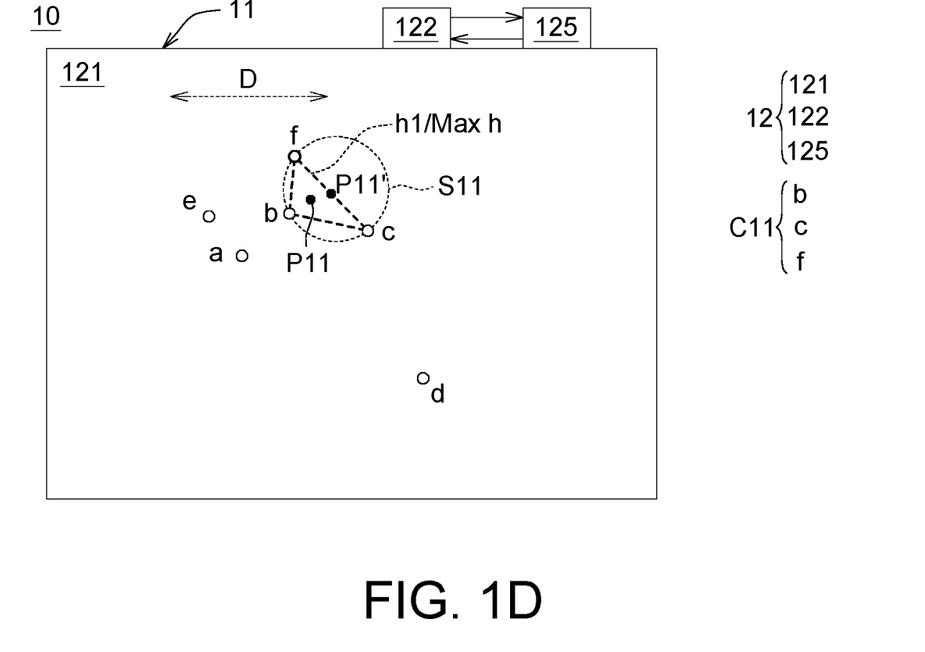

As shown in FIG. 1D, among the above distances h1-h15, the lengths of the distances h7, h8, h9, h10, h12, h13, and h14 are all greater than the preset distance D; while the distances h2, h3, h4, h5, h6, h11 and h15 are less than the preset distance D, and the largest distance Max h that meets the condition of less than the preset distance D (Max h<D) is the distance h1 between the contact points c and f.

Subsequently, a first contact points cluster C11, among the plurality of contact points a, b, c, e and f, that falls into a first circular area S11 formed by two ends (the contact points c and f) of the largest distance Max h, are recognized as belonging to a first touch point P11 (see step 104 in FIG. 1A). In the present embodiment, the first circular area S11 may be a circular area formed on the touch panel 121 using the largest distance Max h (spacing h1) as the diameter, and using the midpoint between the two ends (between the contact points c and f) as the center. Wherein, the first contact points cluster C11 composed of contact points b, c, and f falls within the first circular area S11, and the three can be determined as belonging to the first touch point P11. In other words, if the average palm width of an adult is used as the preset distance D, these three contact points b, c, and f may be within the palm width of the same person, so they are recognized as belonging to the first touch point P11.

Next, a first coordinate of the first touch point P11 is obtained (see step 105 in FIG. 1A). In the present embodiment, the step of determining the first coordinate includes forming a first polygon (such as, the triangle Δbcf) by the contact points b, c, and f of the first contact points cluster C11 and calculating the center of gravity coordinate of the first polygon (such as, the triangle Δbcf) to take it as the first coordinate of the first touch point P11.

However, it should be appreciated that the method for determining the first touch point P1 is not limited to this regard. In other embodiments of the present disclosure, the step of determining the first touch point P11' includes calculating the midpoint coordinate of the two end points (ie, the contact points c and f) of the largest distance Max h (ie, the distance h1) to take it as the first coordinate of the first touch point P11' (as shown in FIG. 1D).

Figure 1E:
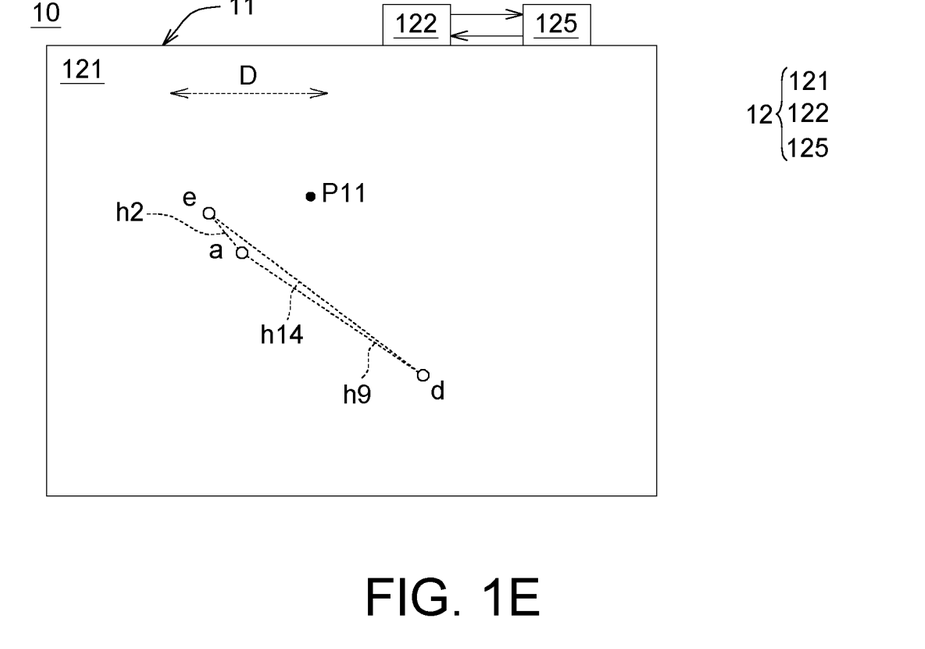

After excluding the first contact points cluster C11 (including the contact points b, c, and f), a second largest distance smaller than the preset distance D is selected from the rest of the plurality of distances h2, h9 and h14 (see step 106 in FIG. 1A). For example, in the present embodiment, the distances h9 and h14 are both greater than the preset distance D; while only the distance h2 remains meeting the conditions of both less than the preset distance D and the distance h1 (h2<h1<D), as shown in FIG. 1E. Therefore, the distance h2 is selected as the second largest distance.

A second contact points cluster C12, among the remaining of the plurality of contact points (including the contact points a, b, and e), that falls into a second circular area S12 formed by two ends (the contact points a and e) of the second largest distance (i.e. the distance h2), is recognized as a second touch point P12 (see step 107 in FIG. 1A). For example, in the present embodiment, the second circular area S12 may be a circular area formed on the touch panel 121 using the second largest distance (i.e. the distance h2) as the diameter and using the midpoint between the contact points a and e as the center. Only the contact points a and e fall within the second circular area S12, and the second contact points cluster C12 composed of contact points a and e can be determined as belonging to the second touch point P12.

Figure 1F:
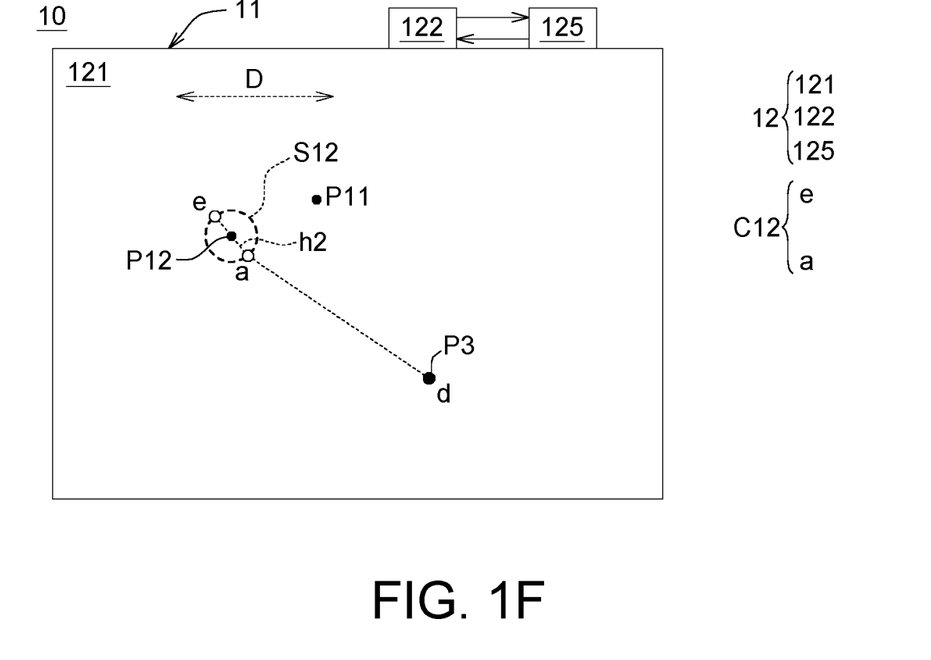

Then, a second coordinate of the second touch point P12 is obtained (see step 108 in FIG. 1A), wherein the method of determining the second coordinate of the second touch point P12 is similar to that of determining the first coordinate of the first touch point P11 (as shown in step 105). In the present embodiment, the second coordinate of the second touch point P12 can be the midpoint coordinate of the two end points (i.e. the contact points a and e) of the second largest distance (i.e. the distance h2) (as shown in FIG. 1F).

Thereafter, check whether there are any remaining contact points (see step 109 in FIG. 1A). If there are remaining contact points, repeat the above steps 106 to 108, and divide the remaining contact points into multiple contact points clusters in the same way. And determine the representative coordinates of these contact points clusters. For example, in the present embodiment, after the contact points a and e are recognized as the second contact points cluster C12, only the contact point d is left to form a third contact points cluster C13. Therefore, the remaining contact point d can be regarded as the third touch point P13, and the coordinates of the contact point d can be directly used as the third coordinate of the third touch point P13.

Subsequently, at least one data processing can be performed by the data processing unit 122 on at least one corresponding position of the image display area 11 according to at least one of the first coordinate, the second coordinate and the third coordinate of the first touch point P11, the second the touch point P12 and the third touch point P13. For example, in one embodiment of the present disclosure, one single-touch can be performed by the data processing unit 122 on a position corresponding to the first coordinate, according to the coordinates of the first touch point P11, the second touch point P12 and the third touch point P13. In another embodiment, one multi-touch operation can be performed by the data processing unit 122 on several positions of the image display area 11 corresponding to different coordinates, according to the coordinates of the first touch point P11, the second touch point P12 and the third touch point P13.

By performing the aforementioned single-touch operation or multi-touch operation, functions of Inputting commands, activating electronic devices, and/or clicking or opening various menus of application functions can be implemented. The problems that the conventional large-scale touch display apparatus cannot recognize the available touch points because of a plurality of points being touched at the same time can be thus resolved.

However, it should be appreciated that the data processing of the aforementioned single-touch operation or multi-touch operation is not limited to apply to this regard. Any data output, calculation or storage selected or triggered by the touch operation are included in the spirit of the data processing described in the present disclosure.

Figure 2:
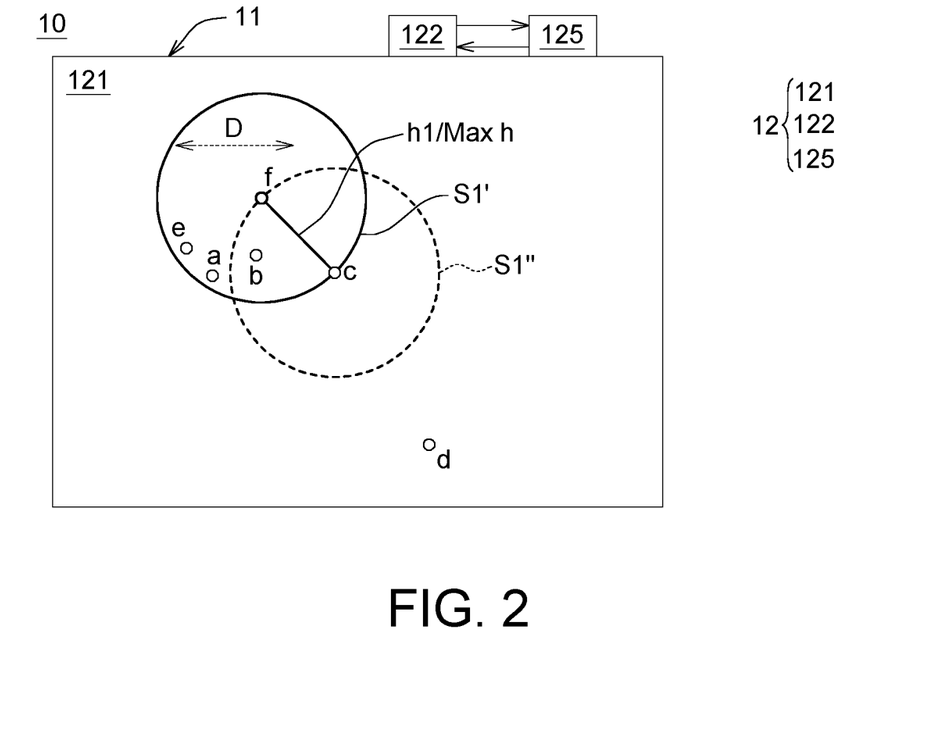
FIG. 2 is a schematic diagram of the screen image of the touch display apparatus performing the touch control method according to another embodiment of this specification.

FIG. 2 is a schematic diagram of the screen image of the touch display apparatus 10 performing the touch control method according to another embodiment of this specification. The touch control method shown in FIG. 2 is substantially similar to that shown in FIGS. 1B to 1F, except the forming of the first circular area S21. The way for forming the first circular area S21 is different from that for forming of the first circular area S11 depicted in FIG. 1D. Since the steps of identifying the contact points being touched on the touch panel 121 at a certain time (such as, step 101) and obtaining the plural distances between each two of the contact points (such as, step 102) are described in FIGS. 1B to 1C, so the details of these steps will not be repeated here.

The description of FIG. 2 follows FIG. 1C, the largest distance Max h (Max h<D) that is smaller than the preset distance D is select among the plurality of distances h1-h15, and the contact points a, b, c, d, e, and f that falls within the first circular area S21 formed by the two end points of the largest distance Max h (i.e. the contact points c and f) in the touch panel 121 is recognized as the first contact points cluster C21. In the present embodiment, the first circular area S21 can be a circular area formed on the touch panel 121 using the largest distance Max h (i.e. the distance h1) as the diameter, and using the contact point c as the center. Wherein, the first contact points cluster C21 composed of contact points b, c, and f falls within the first circular area S21, and the three can be determined as belonging to the first touch point P21.

Instead, the first circular area S21' can be a circular area formed on the touch panel 121 using the largest distance Max h (i.e. the distance h1) as the diameter, and using the contact point f as the center. Wherein, the first contact points cluster C21' composed of contact points a, b, c, f and e falls within the first circular area S21', and the five can be determined as belonging to the first touch point P21'.

Since the ranges covered by the first circular regions S21 and S21' are different, the number of contact points included in the first contact points clusters C21 and C21' may also be different. In this case, the circular area S21' covering the largest number of contact points can be selected to determine the first touch point P21'. For example, in the present embodiment, the first contact points cluster C21' composed of contact points a, b, c, f, and e is selected; and the first contact points cluster C21 composed of contact points b, c, and f is discarded, whereby the first touch point P21' can be determined.

Because only the contact point d is left in the follow-up, the contact point d can be directly regarded as the third touch point P13, and the coordinates of the contact point d can be taken as the third coordinates of the third touch point P13.

Subsequently, at least one data processing, e.g. Inputting commands, activating electronic devices, and/or clicking or opening various menus of application functions, can be performed by the data processing unit 122 on at least one corresponding position of the image display area 11 according to at least one of the first coordinate, the second coordinate and the third coordinate of the first touch point P21', the second the touch point P12 and the third touch point P13.

Figure 3A:
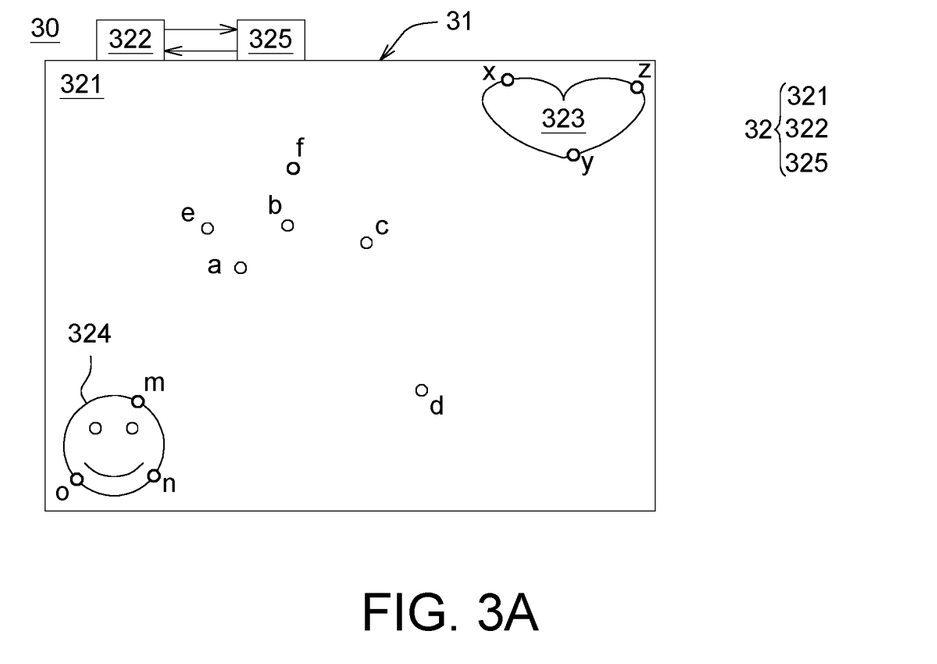
FIGS. 3A to 3E are schematic diagrams of the screen images of the touch display apparatus performing the touch control method according to yet another embodiment of this specification.

In some other embodiments of the present disclosure, it also includes the use of hand-held tools (such as, the tools 323 and 324) applied by the touch operating system 32 to execute specific application operations. FIGS. 3A to 3E are schematic diagrams of the screen images of the touch display apparatus 30 performing the touch control method according to yet another embodiment of this specification. The touch control method includes steps as follows:

Firstly, a plurality of contact points being touched on the touch panel 321 at a certain time are identified. Since the detailed description of this step has been disclosed in FIG. 1B, it will not be repeated here. In the present embodiment, the contact points being touched on the touch panel 321 include not only the contact points a, b, c, d, e, and f as shown in FIG. 1B, but also the contact points m, n, o, x, y, and z (as shown in FIG. 3A).

A plurality of distances between each two of the plurality of contact points are obtained. The detailed description of this step also has been disclosed in FIG. 1C, it will not be repeated here. For the purpose of clear description, mere the distances h1-h15 between any two of the contact points a, b, c, e and f, the distances h16, h17, and h18 between any two of the contact points x, y and z as wells as the distances h19, h20, and h21 between any two of the contact points m, n and o are shown in FIG. 3B.

Afterwards, a largest tool distance dw1 which is greater than a preset distance D and smaller than a first tool width Dw1 is select from the plurality of distances h1-h21 (D<dw1<Dw1). For example, in the present embodiment, the largest width of the tool 323 can be used as the preset first tool width Dw1, which is input in advance into the built-in database 325 of the touch operating system 32 of the touch display apparatus 30, and logical operations are then performed by the data processing unit 322 of the touch display apparatus 30 according to the data in the database 325 and the data detected by the touch panel 321.

Figure 3B:
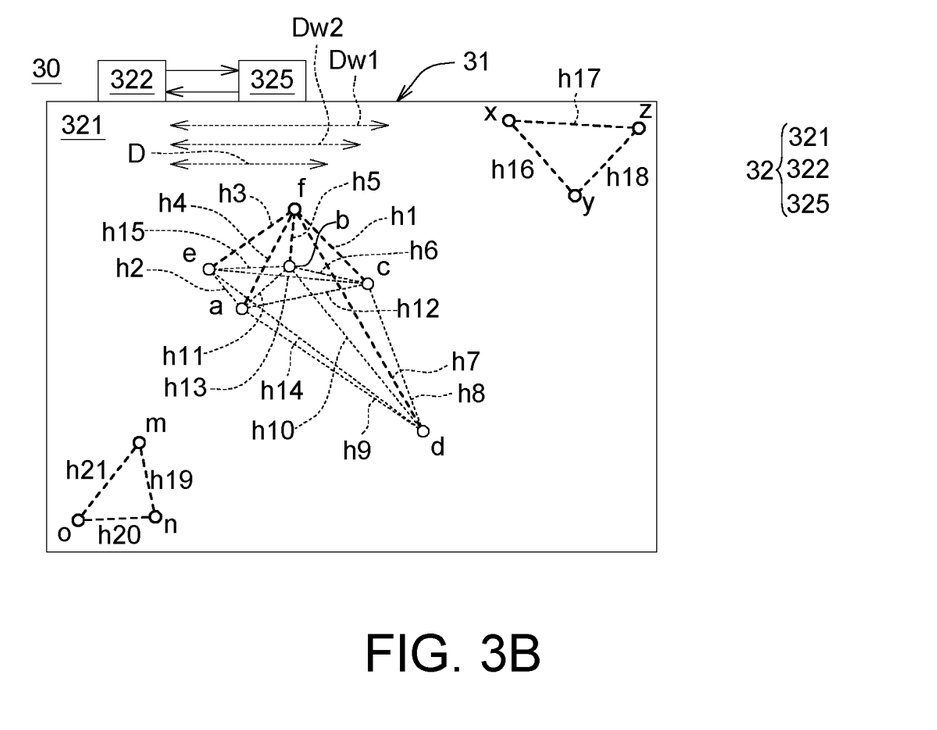

As shown in FIG. 3B, among the above-mentioned plural pitches h1-h21, since the lengths of the pitches h7, h8, h9, h10, h12, h13, and h14 are all greater than the first tool width Dw1; mere the distance h17, h16 and h21 is greater than the preset distance D and smaller than the first tool width Dw1. Wherein, the distance that meets the condition of the largest tool distance dw1 (D<dw1<Dw1) is the distance h17 between the contact points x and z.

Figure 3C:
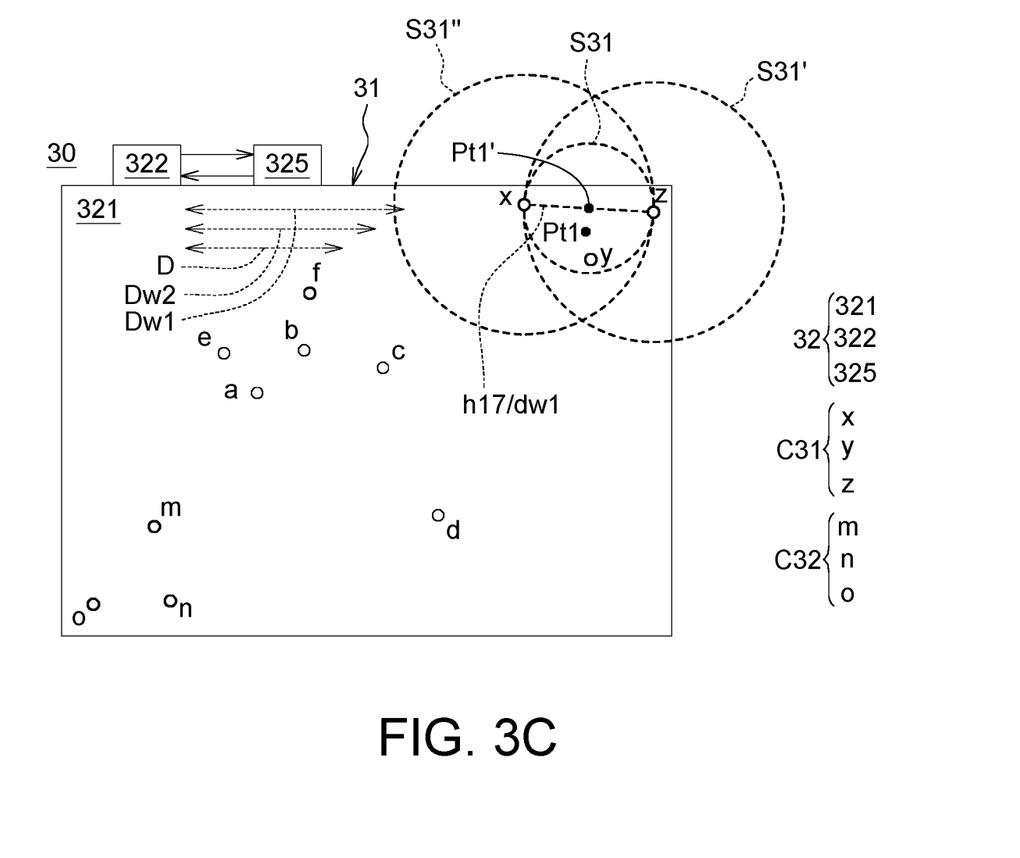

Subsequently, a first tool contact points cluster C31 among the plurality of contact points that falls into a third circular area S31 formed by two ends (the contact points x and z) of the largest tool distance are recognized as belonging to a first tool touch point Pt1. In the present embodiment, the third circular area S31 can be a circular area formed on the touch panel 321 using the largest tool distance dw1 (i.e. the distance h17) as the diameter and using the midpoint between the contact points x and z as the center, wherein the contact points x, y, and z fall within the third circular area S31. Therefore, the first tool contact points cluster C31 composed of contact points x, y, and z can be recognized belonging to the first tool touch point Pt1 (as shown in FIG. 3C).

As mentioned above, the third circular regions S31' and S31" with different coverage can be formed in different ways. For example, in FIG. 3, the third circular area S31' may be a circular area formed on the touch panel 321 using the largest tool distance dw1 (i.e. the distance h17) as the radius and using the contact point x as the center. Alternatively, the third circular area S31" may be a circular area formed on the touch panel 321 using the largest tool distance dw1 (i.e. the distance h17) as the radius and using the contact point z as the center. In the present embodiment, no matter which way is used to form the third circular area, all the obtained first tool contact points clusters C31 are composed of three contact points x, y, and z. Therefore, it can be determined the first tool contact points cluster C31 composed of the contact points x, y, and z belongs to the first tool touch point Pt1.

Next, a coordinate of the first tool touch point Pt1 is obtained. In the present embodiment, the step of determining the coordinate of the first tool touch point Pt1 includes forming a polygon (such as, the triangle Δxyz) by the contact points x, y, and z of the first tool contact points cluster C31 and calculating the center of gravity coordinate of the triangle Δxyz to take it as the coordinate of the first tool touch point Pt1.

However, it should be appreciated that the method for determining the coordinate of the first tool touch point Pt1 is not limited to this regard. In other embodiments of the present disclosure, the step of determining the coordinate of the first tool touch point Pt1' includes calculating the midpoint coordinate of the two end points (i.e. the contact points x and y) of the largest tool distance dw1 (i.e. the distance h17) to take it as the coordinate of the first tool touch point Pt1'.

Next, the information of the largest tool distance dw1 and/or the area of the third circular area S31, that is related to the tool 323 can be compared with the built-in database 325 of the touch display apparatus 30 by the data processing unit 322, and the matched content information 326 can be sent to and displayed on the image display area 31 of the touch display apparatus 30.

In the present embodiment, the matched content information 326 resulted from the comparison of the largest tool distance dw1 and the built-in database 325 is a dinosaur pattern. When the data processing unit 322 detects the touch points x, y, and z that match the condition of having the largest tool distance dw1 and/or the area of the third circular area S31 on the touch panel 321, the dinosaur pattern can be displayed on the position of the image display area 31 of the touch display apparatus 30 corresponding to the coordinates of the first tool touch point Pt1.

Figure 3D:
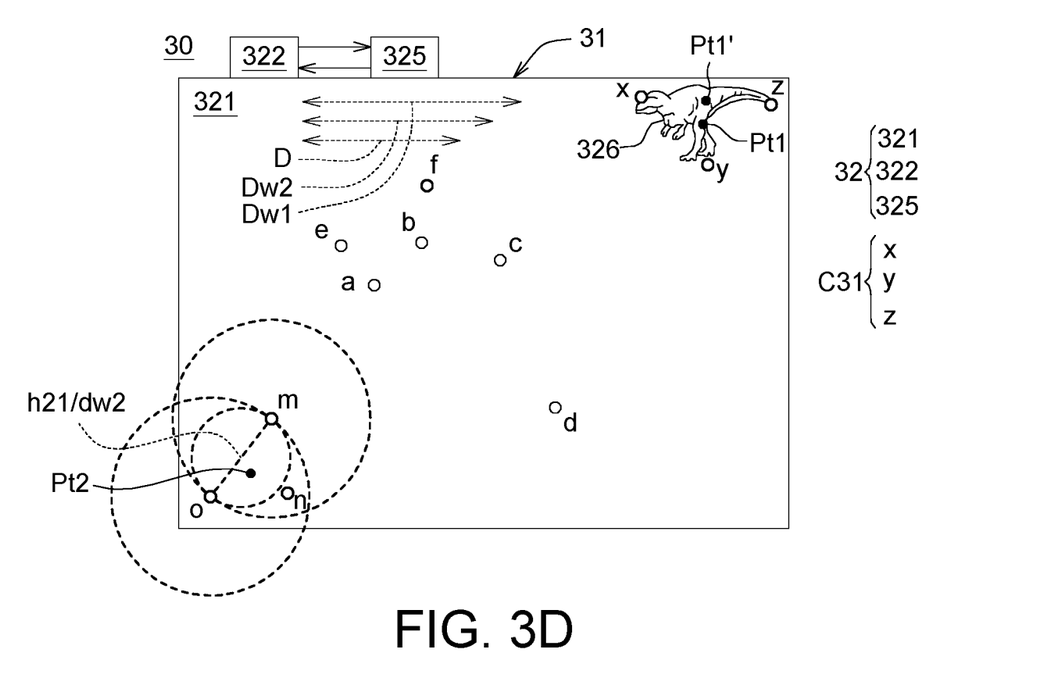
Figure 3E:
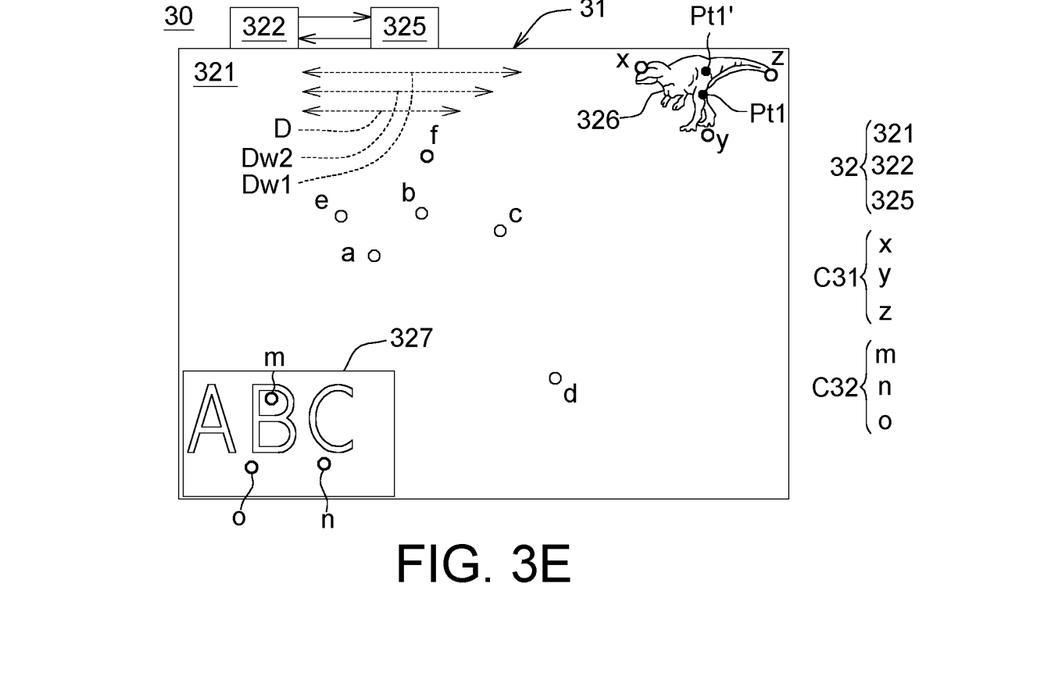

After excluding the first tool contact points cluster C31 (including the contact points x, y, and z), a second largest tool distance dw2 greater than the preset distance D and smaller than a second tool width Dw2 of a tool 324 (D<dw2<Dw2) is selected from the rest of the plurality of distances h1-h16 and h18-h21. In the present embodiment, the second tool width Dw2 of the tool 324 has also been pre-input in the database 325 of the data processing unit 322 for performing logical operations based on the data detected by the touch panel 321 by the data processing unit 322. As shown in FIG. 3D, among the distances h1-h16 and h18-h21, mere the distance h21 between the contact points o and m meets the condition (D<dw2<Dw2) of the second largest tool distance dw2.

A second tool contact points cluster C12, among the remaining of the plurality of contact points, that falls into a fourth circular area S32 formed by two ends (the contact points m and o) of the second largest distance dw2 (i.e. the distance h21) is recognized as a second tool touch point Pt2. In the present embodiment, the fourth circular area S32 can be a circular area formed on the touch panel 321 using the second largest distance dw2 (i.e. the distance h21) as the diameter and using the midpoint between the contact points m and o. Alternatively, it can be the fourth circular area S32' formed on the touch panel 321 using the second largest distance dw2 (i.e. the distance h21) as the radius and using the contact point m as the center; or can be the fourth circular area S32" formed on the touch panel 321 using the second largest distance dw2 (i.e. the distance h21) as the radius and using the contact point o as the center.

Because only the contact points m, o, and n fall within the fourth circular area S32 (the fourth circular area S32' and S32"), so it can be determined that the second tool contact point cluster C32 composed of the contact points m, o, and n belongs to the second tool touch point Pt2 and covered by the tool 324 (as shown in FIG. 3D).

Next, a coordinate of the second tool touch point Pt2 is obtained. In the present embodiment, the step of determining the coordinate of the second tool touch point Pt2 includes taking the center of gravity coordinate of the triangle Δmon formed by the contact points m, o, and n of the second tool contact points cluster C32 as the coordinate of the second tool touch point Pt2; or taking the coordinate of the midpoint (not shown) between the two end points (i.e. the contact points m and o) of the second largest tool distance dw2 as the coordinate of the second tool touch point Pt2.

Subsequently, the information of the second largest tool distance dw2 and/or the area of the fourth circular area S32, that is related to the tool 324 can be compared with the built-in database 325 of the touch display apparatus 30 by the data processing unit 322, and the matched content information 327 can be sent to and displayed on the image display area 31 of the touch display apparatus 30.

In the present embodiment, the matched content information 327 resulted from the comparison of the second largest tool distance dw2 and the built-in database 325 is a pattern of English letters ABC When the data processing unit 322 detects the touch points m, n, and o that match the condition of having the second largest tool distance dw2 and/or the area of the fourth circular area S32 on the touch panel 321, the pattern of English letters ABC can be displayed on the position of the image display area 31 of the touch display apparatus 30 corresponding to the coordinates of the second tool touch point Pt2.

After excluding the first tool contact points cluster C31 (including the contact points x, y, and z) and the second tool contact points cluster C32 (including the contact points m, o, and n), the operations described in FIGS. 1B to 1F, such as inputting commands, activating electronic devices, and/or clicking or opening menu or functions of various applications can be performed through single-touch or multi-touch operations described in FIG. 1B to FIG. 1F. Since the detailed of these operations are described in detail above, thus are not repeated here.

According to the above description, the embodiments of the disclosure provide a touch control method and a touch operation system applied to a touch display apparatus. By using a preset distance as a judgment standard to divides a plurality of contact points being touched on a touch area of the touch display apparatus at a certain time into several contact points clusters, and the representative coordinates of these contact points clusters can be obtained to serve as the available touch points for performing at least one data processing, such as inputting instructions, starting electronic devices, and/or clicking or opening various menus or functions including applications (APP); meanwhile the operations of the data processing can be displayed on the corresponding position of the display area of the touch display apparatus. The problems that the conventional large-scale touch display apparatus cannot recognize the available touch points because of a plurality of points being touched at the same time can be thus resolved.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A touch control method, applied in a touch display apparatus which includes an image display area and a touch panel corresponding to the image display area, wherein the touch control method comprises:
    identifying a plurality of contact points being touched on the touch panel at a certain time;
    obtaining a plurality of distances between each two of the plurality of contact points;
    selecting a largest distance smaller than a preset distance from the plurality of distances;
    recognizing a first contact points cluster among the plurality of contact points, that falls into a first circular area formed by two ends of the largest distance, as belonging to a first touch point;
    obtaining a first coordinate of the first touch point;
    excluding the first contact points cluster;
    selecting a second largest distance smaller than the preset distance from a rest of the plurality of distances;
    recognizing a second contact points cluster among a remaining of the plurality of contact points, that falls into a second circular area formed by two ends of the second largest distance, as a second touch point;
    obtaining a second coordinate of the second touch point; and performing at least one data processing on at least one corresponding position of the image display area according to at least one of the first coordinate and the second coordinate.

2. The touch control method according to claim 1, wherein the first circular area is a circular area formed on the touch panel using the largest distance as a diameter.

3. The touch control method according to claim 1, wherein the first circular area is a circular area formed on the touch panel using one of two end points of the largest distance as a center, and using the largest distance as a radius; and the first circular area is a circular area' covering the largest number of the plurality of contact points.

4. The touch control method according to claim 1, wherein
the process of obtaining the first coordinate comprises calculating a center of gravity coordinate of a first polygon formed by the first contact points cluster; and
the process of obtaining the second coordinate comprises calculating a center of gravity coordinate of a second polygon formed by the second contact points cluster.

5. The touch control method according to claim 1, wherein
the process of obtaining the first coordinate comprises calculating a coordinate of a first midpoint between two end points of the largest distance; and
the process of obtaining the second coordinate comprises calculating a coordinate of a second midpoint between two end points of the second largest distance.

6. The touch control method according to claim 1, prior to selecting the largest distance, further comprising:
selecting a largest tool distance greater than the preset distance and smaller than a first tool width from the plurality of distances;
recognizing a first tool contact points cluster among the plurality of contact points, that falls into a third circular area formed by two ends of the largest tool distance as belonging to a first tool touch point;
obtaining a third coordinate of the first tool touch point; and
comparing one of the largest tool distance and the third circular area with a built-in database, and then sending a matched content information to the image display area of the touch display apparatus for displaying.

7. The touch control method according to claim 6, further comprising:
excluding the first contact points cluster;
selecting a second largest tool distance greater than the preset distance and smaller than a second tool width from a rest of the plurality of distances;
recognizing a second tool contact points cluster among a remaining of the plurality of contact points, that falls into a fourth circular area formed by two ends of the second largest tool distance, as belonging to a second tool touch point; and
obtaining a fourth coordinate of the second tool touch point.

8. The touch control method according to claim 7, wherein
the process of obtaining the third coordinate comprises calculating a center of gravity coordinate of a third polygon formed by the first tool contact points cluster, or calculating a coordinate of a midpoint between two end points of the largest tool distance; and
the process of obtaining the fourth coordinate comprises calculating a center of gravity coordinate of a fourth polygon formed by the second tool contact points cluster, or calculating a coordinate of a midpoint between two end points of the second largest tool distance.

9. A touch control system, applied in a touch display apparatus, comprises:
a touch panel corresponding to the image display area, used to identify a plurality of contact points being touched on a touch area at a certain time; and
a data processing unit, used for:
obtaining a plurality of distances between each two of the plurality of contact points;
selecting a largest distance smaller than a preset distance from the plurality of distances;
recognizing a first contact points cluster among the plurality of contact points, that falls into a first circular area formed by two ends of the largest distance, as belonging to a first touch point;
obtaining a first coordinate of the first touch point;
excluding the first contact points cluster;
selecting a second largest distance smaller than the preset distance from a rest of the plurality of distances;
recognizing a second contact points cluster among a remaining of the plurality of contact points, that falls into a second circular area formed by two ends of the second largest distance, as a second touch point;
obtaining a second coordinate of the second touch point; and
performing at least one data processing on at least one corresponding position of the image display area according to at least one of the first coordinate and the second coordinate.

10. The touch control system according to claim 9, wherein
the process of obtaining the first coordinate comprises calculating a center of gravity coordinate of a first polygon formed by the first contact points cluster; and
the process of obtaining the second coordinate comprises calculating a center of gravity coordinate of a second polygon formed by the second contact points cluster.

11. The touch control system according to claim 9, wherein
the process of obtaining the first coordinate comprises calculating a coordinate of a first midpoint between two end points of the largest distance; and
the process of obtaining the second coordinate comprises calculating a coordinate of a second midpoint between two end points of the second largest distance.

12. The touch control system according to claim 9, further comprising:
selecting a largest tool distance greater than the preset distance and smaller than a first tool width from the plurality of distances;
recognizing a first tool contact points cluster among the plurality of contact points, that falls into a third circular area formed by two ends of the largest tool distance as belonging to a first tool touch point;
obtaining a third coordinate of the first tool touch point; and
comparing one of the largest tool distance and the third circular area with a built-in database, and then sending a matched content information to the image display area of the touch display apparatus for displaying.

13. The touch control system according to claim 12, further comprising:
excluding the first contact points cluster;

selecting a second largest tool distance greater than the preset distance and smaller than a second tool width from a rest of the plurality of distances;

recognizing a second tool contact points cluster among a remaining of the plurality of contact points, that falls into a fourth circular area formed by two ends of the second largest tool distance, as belonging to a second tool touch point; and obtaining a fourth coordinate of the second tool touch point.

14. The touch control system according to claim 13, wherein the process of obtaining the third coordinate comprises calculating a center of gravity coordinate of a third polygon formed by the first tool contact points cluster, or calculating a coordinate of a midpoint between two end points of the largest tool distance; and the process of obtaining the fourth coordinate comprises calculating a center of gravity coordinate of a fourth polygon formed by the second tool contact points cluster, or calculating a coordinate of a midpoint between two end points of the second largest tool distance.

* * * * *